Patented Feb. 9, 1943

2,310,780

UNITED STATES PATENT OFFICE 2,310,780

VINYL ESTERS OF TERTIARY CARBOXYLIC ACIDS

William Edward Hanford and Walter Edwin Mochel, Wilmington, Del., assignors to E. I. du Pont de Nemours & Company, Wilmington, Del., a corporation of Delaware No Drawing. Application September 5, 1940, Serial No. 355,524

15 Claims. (Cl. 260—73)

This invention relates to new polymeric products, and more particularly a new class of vinyl polymers.

The stability and weathering properties of polyvinyl esters depend largely upon the hydrolyzability of the esters. The properties of polyvinyl alcohol polymers and particularly the solubilities vary widely depending, inter alia, upon the degree of hydrolysis of the polyvinyl ester from which they are derived. It is difficult to regulate the hydrolysis of a polymer containing ester groups, such as vinyl acetate, so as to leave in the final polymer the desired balance of hydroxyl and ester groups. Even when this balance is attained, it is not necessarily permanent. There is therefore a definite need for a polyvinyl ester, or a polyvinyl ester containing free hydroxyl groups, which would be substantially completely resistant to hydrolysis.

This invention has as an object the preparation of new vinyl esters. Another object is the preparation of new vinyl polymers including interpolymers. A further object is the preparation of new vinyl polymers having ester groups of different hydrolytic susceptibilities. Another object is the preparation of polyvinyl alcohol polymers containing ester groups having, in the polymer, slight if any hydrolytic susceptibilities. Other objects will appear hereinafter.

These objects are accomplished by the following invention of vinyl esters of aliphatic, including cycloaliphatic, carboxylic acids of not more than twelve carbon atoms wherein the carbon alpha to the carboxyl carbon is a quaternary carbon atom, i. e., attached to four carbon atoms. The invention also includes the polymers of such esters, including interpolymers, particularly those interpolymers with vinyl esters of acids which, in the polymer, are susceptible of hydrolysis, and the hydrolysis products of said polymers, which hydrolysis products are themselves still polymeric vinyl esters of the acyclic alpha-quaternary carboxylic acids.

The monomeric esters of the present invention are preferably prepared by the addition of acetylene to the organic acid in the presence of a proper catalyst. The organic acid may be agitated with a mercuric sulfate or mercuric phosphate catalyst in a pressure vessel containing acetylene at 60–110° C. and 150–250 lbs./in.² pressure. Usually it is preferable not to use a solvent but an inert solvent such as dioxan may be used when the solubility of acetylene in the organic acid is extremely low. The monomeric esters may be prepared by any other convenient method such as pyrolysis of ethylene diesters or dehydrohalogenation of halogen ethyl esters.

The polymeric products of this invention are prepared by polymerizing the appropriate monomers or mixtures of monomers. The polymerization is preferably carried out in an aqueous emulsion, but any of the known methods may be used. For example, the monomer, or mixture of monomers, is emulsified in water by means of vigorous stirring, preferably in the presence of an emulsifying agent such as methyl starch or the sodium salt of an interpolymer of methacrylic acid and methyl methacrylate. The emulsion is heated to about 50°–80° C. in a vessel equipped with an efficient stirrer and a reflux condenser and a catalyst added. The catalyst used is preferably a peroxide such as benzoyl peroxide. When large quantities of monomer are being polymerized, it is usually advisable to add the catalyst in small lots to prevent the reaction from becoming too vigorous. When the reaction begins, the liquid usually begins to reflux and the temperature of the batch remains constant. The polymerization is usually complete when the refluxing stops and the temperature begins to rise again. The product, usually a hard granular solid, is separated by filtration or centrifugation and dried.

The polymeric vinyl ester of acids having a quaternary carbon atom alpha to the carbonyl group have the remarkable property of being substantially completely resistant to hydrolysis. When the polymer prepared is an interpolymer of esters such as vinyl acetate and vinyl campholate, it may then be hydrolyzed, thus removing all the acetate groups, to obtain a polyvinyl alcohol having the desired ratio of nonhydrolyzable ester (campholate) groups. The polymer should preferably be dissolved in an appropriate solvent such as alcohol or dioxane, and this polymer solution added slowly with stirring to a solution of an equivalent amount of potassium hydroxide in 95% alcohol. The resulting solution is then stirred and heated gently in a vessel equipped with a reflux condenser. In some cases, it is advisable simply to let the alkaline solution stand for several hours. If it is heated and refluxed, it should be refluxed for only a short time, because extended heating in the presence of strong alkali causes the formation of undesirable color. The hydrolyzed product may precipitate from the solution, depending upon the ratio of polyvinyl alcohol to polyvinyl ester groups. If there are sufficient ester groups left to maintain it in solution, e. g., 30–50%, it is advisable to pour the alcoholic product into a large amount of cold water in a vessel equipped with an efficient stirrer. In either case, the resulting polymer is separated by filtration or centrifugation and carefully dried. The hydrolyzed interpolymer may subsequently be converted into an acetal, ketal, or any polyvinyl derivative by proper treatment.

The following examples wherein parts are by weight and temperatures are in degree centigrade illustrate the preparation of the monomeric esters.

*Example I*

*Vinyl campholate.*—One hundred parts of campholic acid and 2 parts of hydroquinone are intimately mixed in a pressure vessel equipped with an efficient stirrer. A finely ground catalyst prepared from 20 parts of yellow mercuric oxide and 8 parts of 85% phosphoric acid is then added to the mixture. Acetylene is pumped into the pressure vessel until a pressure of 210–230 lbs./sq. in. is reached and further acetylene is added as the pressure drops. The reaction is started at 100° to melt the campholic acid, and then the temperature is dropped to 80° and maintained at that temperature until the absorption of acetylene has practically stopped. The product is dissolved in ether, filtered to remove the catalyst, and washed with cold 10% potassium hydroxide solution. The ether extract is dried with sodium sulfate and distilled at 5 mm. pressure. Redistillation of the first fraction gives 32 parts of vinyl campholate boiling at 78–79° C./7 mm.

Analysis: Calculated for $C_{12}H_{20}O_2$; C, 73.43%; H, 10.27%
Found: C, 73.02%; H, 10.02%

*Example II*

A solution of 0.6 part of methylstarch in 500 parts of water is heated to 80° C. and 200 parts of vinyl campholate is added. The mixture is vigorously stirred to emulsify the oily monomer in the water. Two parts of benzoyl peroxide is added and the vigorously stirred emulsion is allowed to heat up to 100° C. After two hours the reaction is complete and the mixture is cooled to below 80° C. before the stirring is stopped. The product is removed by filtration and consists of 170 parts of a hard, white, granular polymer. This polymer can be molded in a hydraulic press at 85° C. and about 10,000 lbs./in.$^2$ to clear, hard chips.

A sample of 5 parts of polyvinyl campholate dissolved in 50 parts of dioxan is refluxed for five hours with 25 parts of a methanol solution of sodium hydroxide containing approximately 1.8 parts of alkali per 25 parts of solution. A solution of 50 parts dioxan and 25 parts of the methanol solution of sodium hydroxide is similarly refluxed for five hours. Test portions of the two solutions are then titrated and found to contain essentially the same amounts of alkali. Samples, 10 cc. each, titrated with 0.3376 N-hydrochloric acid required:

Polymer solution: 21.78 cc. 21.79 cc.
Control solution: 21.31 cc. 21.32 cc.

These results prove that polyvinyl campholate is non-hydrolyzable.

*Example III*

The vinyl campholate monomer may be interpolymerized to a partially hydrolyzable polymer as in the following illustrative example:

A mixture of 210 parts of vinyl acetate and 70 parts of vinyl campholate is emulsified in a solution of 15 parts of the sodium salt of methacrylic acid (75%): methyl methacrylate (25%) interpolymer in 800 parts of water. This solution is vigorously stirred in a vessel equipped with a reflux condenser. It is heated to about 55–60° C. and the catalyst, 1.4 parts of benzoyl peroxide, is added. The temperature of the mixture slowly rises until the polymerization begins, and then it remains constant at about 68° C. an refluxing begins. After three hours, the temperature is usually above 75° C. and refluxing has stopped. This rise in temperature and cessation of reflux indicates that polymerization is substantially complete. The mixture is cooled to room temperature before the stirring is discontinued. The product is then isolated by filtration, washed well with water, and dried. A total of 205 parts of hard, clear, granular interpolymer is obtained.

The following example illustrates the preparation of polyvinyl alcohol polymers wherein a part of the alcoholic hydroxyl groups is esterified with an aliphatic monocarboxylic acid of not more than twelve carbon atoms having a quaternary alpha carbon.

*Example IV*

A sample of 180 parts by weight of the vinyl acetate-vinyl campholate interpolymer of Example III is tumbled with 1300 parts of 95% alcohol until a clear solution is obtained. This polymer solution is then added slowly with stirring to a solution of 120 parts of potassium hydroxide in 1000 parts of 95% alcohol. The resulting mixture is allowed to stand at room temperature in a closed vessel. The solution becomes a light-brown and slowly precipitates a solid on standing. The precipitate is removed by filtration after about twelve hours, and 76 parts of a dry, slightly colored powder is obtained. This solid is insoluble in water, but completely soluble in hot alcohol and slightly soluble in cold alcohol. The main alcoholic filtrate is then slowly poured into a large amount of cold water with vigorous stirring and an additional 27 parts of polymer precipitates and is obtained as a light colored solid. This interpolymer is stable, i. e., cannot be hydrolyzed further, which is an obvious and substantial advantage over partly hydrolyzed polyvinyl acetate.

Any aliphatic monocarboxylic acid having a quaternary alpha-carbon atom and containing not more than twelve carbon atoms may be used for the preparation of the monomeric vinyl ester. The monocarboxylic acid may, subject to the above conditions, be any acyclic aliphatic acid, such as 2,2-dimethylbutyric acid, triethylacetic acid, 2,2-dimethylcaproic acid, 2-methyl-2-ethylbutyric acid, 5-carbethoxy-2,2-dimethylpentanoic acid $(C_2H_5OCO(CH_2)_3C(CH_3)_2COOH)$ etc. It may be any alicyclic aliphatic monocarboxylic acid having not more than twelve carbon atoms and having a quaternary alpha-carbon atom, e. g., fencholic acid, 1-methylcyclohexane-1-carboxylic acid, etc. It may also be any araliphatic monocarboxylic acid having a quarternary alpha-carbon atom, such as 2,2-diphenylpropionic acid, 2,2-diethylphenylacetic acid, etc. By aliphatic monocarboxylic acid is meant a compound having one free carboxylic acid group attached to an aliphatic, including cycloaliphatic, carbon atom. This includes partially esterified polycarboxylic acids having one free carboxyl group.

The acids used may be substituted by any groups which do not prevent or interfere with the polymerization. Thus, acids such as 3-chloro-2,2-dimethylbutyric acid, 3-methoxy-2,2-diethylpropionic acid, etc., may be used. For the purpose of this invention, vinyl esters of acids having not more than twelve carbon atoms are used because it has been found that acids of greater carbon content usually lead to low melting, waxy polymers.

The monomeric vinyl esters may be polymerized either with or without another polymerizable organic compound. In this latter modification, any organic compound polymerizable to an addition type polymer may be polymerized with the vinyl esters of this invention but preferably there is used a polymerizable organic compound having a methylene ($CH_2$) group attached by an ethylenic double bond to a carbon which is in turn attached to a negative group, for example, vinyl esters of organic acids such as vinyl formate, vinyl acetate, and vinyl chloroacetate, or compounds such as styrene, vinyl chloride, asymmetrical dichloroethylene, methyl methacrylate, acrylonitrile, or methacrylamide. A particularly desirable class of materials for interpolymerization with the vinyl esters of the present invention is that of vinyl esters, which in the polymeric form, are known to be hydrolyzable, for example, vinyl acetate. This interpolymerization permits the preparation (by hydrolysis of the hydrolyzable portion of the interpolymer) of polyvinyl alcohols having any desired proportion of the hydroxyl groups esterified with non-hydrolyzable ester groups.

The monomers, or mixtures of monomers, may be polymerized by any convenient method. The polymerization is preferably either a granular or emulsion polymerization, but it may also be carried out in bulk or in solution. In the case of the emulsion or granular polymerization, any emulsifying agent may be chosen which does not interfere with the polymerization. Furthermore, any medium may be chosen, but water is the preferred medium. Any inert solvent may be chosen for the solution polymerization.

The monomers or mixtures of monomers may be polymerized with polymerization catalysts other than benzoyl peroxide. They may be polymerized by means of a peroxide catalyst such as benzoyl peroxide, hydrogen peroxide, urea peroxide, lauryl peroxide, succinic peroxide, etc. They may be polymerized by means of ultraviolet light, or by means of boron trifluoride, or by means of metal halide catalysts such as ferric chloride, copper chloride, etc., or by means of such catalysts as sulfur dioxide, sodium, etc. In some cases they may even be polymerized without a catalyst.

The temperatures used in polymerization will vary with the individual monomers. However, the temperature used may vary from room temperature or slightly lower to above the atmospheric boiling points of the individual monomers, this latter, however, ordinarily under pressure.

It is not necessary to carry out the polymerization under atmospheric pressure. The pressure used may vary from below atmospheric to considerably above. Furthermore, it is sometimes advisable to use an inert atmosphere, e. g., of nitrogen, or carbon dioxide.

The hydrolysis of the interpolymeric vinyl ester may be carried out by means of either alkalies or acids, in any appropriate solvent or mixture of solvents in place of the solvents described in the examples given above. It is, however, advisable to use a solvent for the polyvinyl ester, and to use equivalent amounts of alkali or acid in a hydroxylated solvent such as alcohol. The alkali used for hydrolysis assistant may be any strong alkali such as sodium hydroxide, potassium hydroxide, lithium hydroxide, tetramethylammonium hydroxide, etc., and the acid used for hydrolysis catalyst may be any strong acid, preferably inorganic. In addition to hydrolysis by means of water, the same end result can be achieved by an ester interchange. Thus an alcohol may be used to react with the polymeric vinyl ester to form a new ester according to the equation:

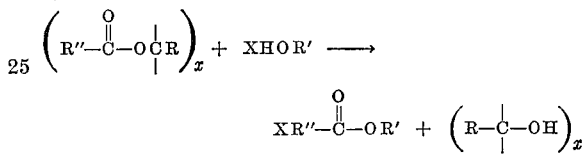

For rapid reaction, the hydrolysis is advantageously carried out at the boiling point of the solvent mixture. The reaction time may vary from a half hour to several hours. Sometimes it is advisable not to use an elevated temperature; the reaction time is then correspondingly longer. The only requirement is that the reaction conditions for the hydrolysis be sufficiently stringent to insure the complete removal of all the hydrolyzable ester groups in the interpolymer.

In the case of vinyl acetate interpolymers, it has been found that the degree of hydrolysis under any standard set of conditions depends upon the particle size of the original polymer. It is preferable to use a mesh size of 48–100 in order to insure complete removal of all hydrolyzable ester groups. It is not necessary to limit the mesh size, but a much better product may be thus obtained, since the reaction time of the hydrolysis is shortened, and there is less likelihood of color developing.

The hydrolyzed interpolymer may be converted into an acetal, ketal, or other derivative as in the following example:

*Example V*

One hundred parts of the hydrolyzed interpolymer of vinyl acetate and vinyl campholate of Example III is dissolved in 500 parts of hot methanol in a vessel equipped with a reflux condenser and an efficient stirrer, and 150 parts isobutyraldehyde, 20 parts water, 4 parts concentrated sulfuric acid, and 300 parts glacial acetic acid are added to the mixture. The resulting mixture is refluxed and stirred for five hours. The slightly yellow solution thus obtained is cooled and filtered. The filtrate is vigorously stirred and the polymer precipitated by the slow addition of a 50:50 water-alcohol solution. The product is washed twice with an alkaline solution (10% sodium hydroxide) and then once with water. A total of 52 parts of dry solid product is obtained. This may be molded at 160° C. to a tough amber-colored solid having a softening point of 60° C.

Any aldehyde may be used in the preparation of the acetals including formaldehyde, acetaldehyde, butyraldehyde, isobutyraldehyde, benzaldehyde, α-naphthaldehyde. Ketals may be prepared from cyclohexanone or from simple ketals such as 2,2-dimethoxypropane, 2,2-diethoxybutane and the acetalization may be conducted according to the methods used in the preparation of polyvinyl acetals.

The products of this invention are of value for all uses requiring polymers of improved stability and weathering properties. The pure non-hydrolyzable vinyl ester polymers may be used wherever a water-stable polyvinyl ester is required. Polyvinyl acetate, for example, is not stable toward aqueous alkali under certain conditions. The products of this invention find uses as molded articles, lacquers, varnishes, and putty-like fixatives. They are also of value for uses where partially hydrolyzed polyvinyl acetate has previously been used, where they serve as stable substitutes for partially hydrolyzed polyvinyl acetate. The products do not undergo further hydrolysis, and may therefore be used under conditions where partially hydrolyzed polyvinyl acetate would not be stable.

The interpolymers of non-hydrolyzable vinyl ester with hydrolyzable vinyl esters prepared by the method of this invention are also of value for purposes requiring a polymeric material having hydroxyl groups together with sufficient ester groups to retain solubility in organic solvents. Such materials are useful as liquid or paste-like cleansing agents, and in the preparation of dye pastes, sizing, or dressing compositions, etc.

Interpolymers of non-hydrolyzable vinyl ester polymers with vinyl compounds other than hydrolyzable vinyl esters, such as unsymmetrical dichloroethylene or styrene are of value where polymers with modified solubility, e. g., solubility in ester solvents, and hardness properties are desired.

The term "polymer" in the specification and claims is meant to include not only the polymers obtained by polymerizing the ester of this invention, but also the products obtained by polymerizing a "non-hydrolyzable" vinyl ester in the presence of one or more other polymerizable constituents, or of plasticizers, fillers, dyes or other similar inert materials.

The above description and examples are intended to be illustrative only. Any modification of or variation therefrom which conforms to the spirit of the invention is intended to be included within the scope of the claims.

What is claimed is:

1. A polymerizable vinyl ester of an aliphatic monocarboxylic acid of not more than twelve carbon atoms having the carbon attached to the carboxyl attached to four carbon atoms.

2. Polymers of a vinyl ester of an aliphatic monocarboxylic acid of not more than twelve carbon atoms having the carbon attached to the carboxyl attached to four carbon atoms.

3. An interpolymer of a vinyl ester of an aliphatic monocarboxylic acid of not more than twelve carbon atoms having the carbon attached to the carboxyl attached to four carbon atoms, with a polymerizable organic compound of the class consisting of vinyl and vinylidene compounds.

4. An interpolymer of a vinyl ester of an aliphatic monocarboxylic acid of not more than twelve carbon atoms having the carbon attached to the carboxyl attached to four carbon atoms, with a vinyl ester, the polymers of which may be hydrolyzed to polyvinyl alcohol.

5. An ester of polyvinyl alcohol wherein at least a portion of the alcoholic hydroxyls are esterified with an aliphatic monocarboxylic acid of not more than twelve carbon atoms having a quaternary alpha-carbon.

6. An ester of polyvinyl alcohol having at least a portion of the alcoholic hydroxyl hydrogens replaced by the acyl radical of an aliphatic monocarboxylic acid of up to twelve carbon atoms having a quaternary alpha-carbon atom, the remainder of the alcoholic hydroxyls being esterified with an acid, the polymeric vinyl esters of which are hydrolyzable to polyvinyl alcohol.

7. An ester of polyvinyl alcohol having a portion only of the alcoholic hydroxyls esterified with an aliphatic monocarboxylic acid of not more than twelve carbon atoms having a quaternary alpha-carbon, the remaining hydroxyls being free.

8. An ester of polyvinyl alcohol having a portion only of the alcoholic hydroxyls esterified with an aliphatic monocarboxylic acid of not more than twelve carbon atoms having a quaternary alpha-carbon, the remaining hydroxyls being combined in an acetal structure.

9. A vinyle ester of campholic acid.

10. Polymers of vinyl campholate.

11. An ester of polyvinyl alcohol having a portion of the alcoholic hydroxyls esterified with campholic acid.

12. An ester of polyvinyl alcohol having a portion of the alcoholic hydroxyls esterified with campholic acid, the remaining hydroxyls being free.

13. An ester of polyvinyl alcohol having a portion of the alcoholic hydroxyls esterified with campholic acid, the remaining hydroxyls being combined in an acetal structure.

14. An ester of polyvinyl alcohol having a portion of the alcoholic hydroxyls esterified with campholic acid, the remaining hydroxyls being esterified with an acid, the polymeric vinyle esters of which are hydrolyzable to polyvinyl alcohol.

15. Polyvinyl acetate campholate.

WILLIAM EDWARD HANFORD.
WALTER EDWIN MOCHEL.